(12) United States Patent
Kim

(10) Patent No.: US 11,746,892 B2
(45) Date of Patent: Sep. 5, 2023

(54) APPARATUS FOR CONTROLLING GEAR SHIFT OF VEHICLE AND METHOD THEREOF

(71) Applicants: Hyundai Motor Company, Seoul (KR); Kia Corporation, Seoul (KR)

(72) Inventor: Jin Sung Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/586,168

(22) Filed: Jan. 27, 2022

(65) Prior Publication Data

US 2023/0045819 A1 Feb. 16, 2023

(30) Foreign Application Priority Data

Aug. 11, 2021 (KR) .................. 10-2021-0106304

(51) Int. Cl.
| | |
|---|---|
| *F16H 59/14* | (2006.01) |
| *F16H 59/42* | (2006.01) |
| *F16H 59/70* | (2006.01) |
| *F16H 59/46* | (2006.01) |
| *F16H 59/44* | (2006.01) |

(Continued)

(52) U.S. Cl.
CPC .......... *F16H 59/141* (2013.01); *F16H 59/42* (2013.01); *F16H 59/44* (2013.01); *F16H 59/46* (2013.01); *F16H 59/70* (2013.01); *F16H 2059/147* (2013.01); *F16H 2059/366* (2013.01); *F16H 2059/465* (2013.01); *F16H 2059/706* (2013.01); *F16H 2061/009* (2013.01); *F16H 2061/0093* (2013.01)

(58) Field of Classification Search
CPC .......... F16H 59/42; F16H 59/44; F16H 59/46; F16H 59/70; F16H 59/141; F16H 2059/147; F16H 2059/366; F16H 2059/465; F16H 2059/706; F16H 2061/009; F16H 2061/0093; F16H 2061/0087; F16H 61/0213; B60W 10/06; B60W 10/113
See application file for complete search history.

(56) References Cited

U.S. PATENT DOCUMENTS

| | | | |
|---|---|---|---|
| 6,360,154 B1 * | 3/2002 | Krenn | B60W 10/11 |
| | | | 701/87 |
| 10,807,601 B1 * | 10/2020 | Cho | B60W 10/06 |

(Continued)

OTHER PUBLICATIONS

Rasmussen et al., "Gaussian Process for Machine Learning," *MIT Press, Massachusetts Institute of Technology*, pp. 1-266 (2006).

(Continued)

*Primary Examiner* — Edwin A Young
(74) *Attorney, Agent, or Firm* — MORGAN, LEWIS & BOCKIUS LLP

(57) ABSTRACT

An apparatus of controlling a gear shifting of a vehicle, and a method thereof, to improving shift quality by minimizing the jerk generated in a shifting process of the vehicle, includes storage that stores a Gaussian process (GP) model on which machine learning is completed, and a controller that detects a change amount of engine torque and a change amount of an engagement-side clutch torque based on the GP model, and controls the gear shifting of the vehicle according to the change amount of the engine torque and the change amount of the engagement-side clutch torque.

18 Claims, 8 Drawing Sheets

(51) Int. Cl.
  *F16H 61/00*       (2006.01)
  *F16H 59/36*       (2006.01)

(56) References Cited

U.S. PATENT DOCUMENTS

2015/0276051 A1* 10/2015 Tsuge ................. F16H 61/0437
                                                            701/59
2020/0309206 A1* 10/2020 Kim ..................... B60W 10/02

OTHER PUBLICATIONS

Hewing et al., "Cautious Model Predictive Control Using Gaussian Process Regression," *Control Systems Technology IEEE Transactions*, vol. 28:6, pp. 1-13 (2020).

* cited by examiner

APPARATUS FOR CONTROLLING GEAR SHIFT OF VEHICLE AND METHOD THEREOF

CROSS-REFERENCE TO RELATED APPLICATION

The present application claims priority to Korean Patent Application No. 10-2021-0106304, filed on Aug. 11, 2021, the entire contents of which is incorporated herein for all purposes by this reference.

BACKGROUND OF THE INVENTION

Field of the Invention

The present invention relates to a technology for controlling a gear shifting of a vehicle based on a Gaussian process (GP) model on which machine learning has been completed.

Description of Related Art

In general, a vehicle provided with a dual clutch transmission (DCT) is configured to receive power from an engine through two clutches, and provide the power to driving wheels after gear shifting. The two clutches are respectively connected to separate input shafts in the DCT to implement shifting stages assigned to each input shaft. The shifting stages assigned to the respective input shafts are usually divided into odd stages and even stages among a series of shifting stages, so that one input shaft is configured to implement only odd stages and the other input shaft is configured to implement only even stages.

The upshift refers to shifting to an upper shifting stage among a series of shifting stages, and in the case of DCT, the upshift which is made while driving at stage K, which is a shifting stage assigned to one input shaft, means that the shift is made to stage K+1 assigned to the other input shaft.

In the instant case, the torque input from the engine may be reduced while the clutch connected to the input shaft implementing the K-stage, which is the current shifting stage, is released, and the clutch, which is connected to the input shaft implementing the K+1 stage which is the target shifting stage, may increase the torque input from the engine while being engaged.

When shifting, the clutch released while reducing the torque input from the engine as described above is called a 'release-side clutch', where the input shaft connected thereto is called an 'release-side input shaft', and the clutch engaged while increasing the torque input from the engine is called an 'engagement-side clutch', where the input shaft connected thereto is called an 'engagement-side input shaft' or a 'target shifting stage input shaft'.

According to the related art, because the shifting of the vehicle is controlled in a proportional integral derivation (PID) scheme using a lookup table, it is impossible to organically control the engine torque and the clutch torque to minimize the jerk generated in the shift process.

The matters described in this background section are intended to promote an understanding of the background of the present invention and may include matters that are not already known to those of ordinary skill in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of controlling a gear shifting of a vehicle and a method thereof, which can detect a change amount of engine torque used for optimal shift and a change amount of engagement-side clutch torque based on a Gaussian process (GP) model on which machine learning has been completed, and control the gear shifting of the vehicle based on the detection result, improving shift quality by minimizing the jerk generated in the shifting process of a vehicle.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a gear shifting of a vehicle may include a storage that stores a Gaussian process (GP) model on which machine learning is completed, and a controller that detects a change amount of an engine torque and a change amount of an engagement-side clutch torque according to the GP model, and controls the gear shifting of the vehicle according to the change amount of the engine torque and the change amount of the engagement-side clutch torque.

According to various exemplary embodiments of the present invention, the controller may input, to the GP model, an engine speed detected in a previous step (k−1), an input shaft speed of a transmission in the vehicle, an engagement-side clutch slip speed, the engine torque, the engagement-side clutch torque, a torsion angle of a driveshaft, the change amount of the engine torque detected in a current step (k), and the change amount of the engagement-side clutch torque, and obtain the engine torque and the engagement-side clutch torque as an output of the GP model.

According to various exemplary embodiments of the present invention, the apparatus may further include a wheel speed sensor configured to detect a wheel speed of the vehicle; a gear stage sensor configured to detect a current gear stage of the vehicle; and a clutch sensor configured to detect an engagement-side clutch speed of the vehicle.

According to various exemplary embodiments of the present invention, the controller may be configured to determine the engagement-side clutch slip speed according to a difference between the engine speed and the engagement-side clutch speed detected by the clutch sensor.

According to various exemplary embodiments of the present invention, the controller may be configured to determine the input shaft speed of the transmission according to the wheel speed detected by the wheel speed sensor and a gear ratio corresponding to the current gear stage detected by the gear stage sensor.

According to various exemplary embodiments of the present invention, the controller may be configured to determine the torsion angle of the driveshaft according to the wheel speed detected by the wheel speed sensor and the engagement-side clutch speed detected by the clutch sensor.

According to various exemplary embodiments of the present invention, the controller may obtain a solution of a model predictive control (MPC) optimization problem according to the GP model to detect the change amount of the engine torque and the change amount of the engagement-side clutch torque.

According to various exemplary embodiments of the present invention, the controller may adjust the engine torque and the engagement-side clutch torque in an inertia phase.

According to various exemplary embodiments of the present invention, the GP model may include a mean function which is a zero-mean type, a covariance function which is squared exponential automatic relevance determination, and uncertainty propagation which is Taylor approximation.

According to various aspects of the present invention, a method of controlling a gear shifting of a vehicle may include storing, by a storage, a Gaussian process (GP) model on which machine learning is completed; detecting, by a controller, a change amount of engine torque and a change amount of an engagement-side clutch torque according to the GP model; and controlling, by a controller, the gear shifting of the vehicle according to the change amount of the engine torque and the change amount of the engagement-side clutch torque.

According to various exemplary embodiments of the present invention, the method may include inputting, to the GP model, an engine speed, an input shaft speed of a transmission in the vehicle, an engagement-side clutch slip speed, the engine torque, the engagement-side clutch torque, a torsion angle of a driveshaft detected at a previous time point, and the change amount of the engine torque and the change amount of the engagement-side clutch torque detected at a current time point; and obtaining the engine torque and the engagement-side clutch torque as an output of the GP model.

According to various exemplary embodiments of the present invention, the method may further include detecting, by a wheel speed sensor, a wheel speed of the vehicle; detecting, by a gear stage sensor, a current gear stage of the vehicle; and detecting, by a clutch sensor, an engagement-side clutch speed of the vehicle.

According to various exemplary embodiments of the present invention, the method may include determining the engagement-side clutch slip speed according to a difference between the engine speed and the engagement-side clutch speed detected by the clutch sensor.

According to various exemplary embodiments of the present invention, the method may include determining the input shaft speed of the transmission according to the wheel speed detected by the wheel speed sensor and a gear ratio corresponding to the current gear stage detected by the gear stage sensor.

According to various exemplary embodiments of the present invention, the method may include determining the torsion angle of the driveshaft according to the wheel speed detected by the wheel speed sensor and the engagement-side clutch speed detected by the clutch sensor.

According to various exemplary embodiments of the present invention, the method may include obtaining a solution of a model predictive control (MPC) optimization problem according to the GP model to detect the change amount of the engine torque and the change amount of the engagement-side clutch torque.

According to various exemplary embodiments of the present invention, the method may include adjusting the engine torque and the engagement-side clutch torque in an inertia phase.

Figure 1:
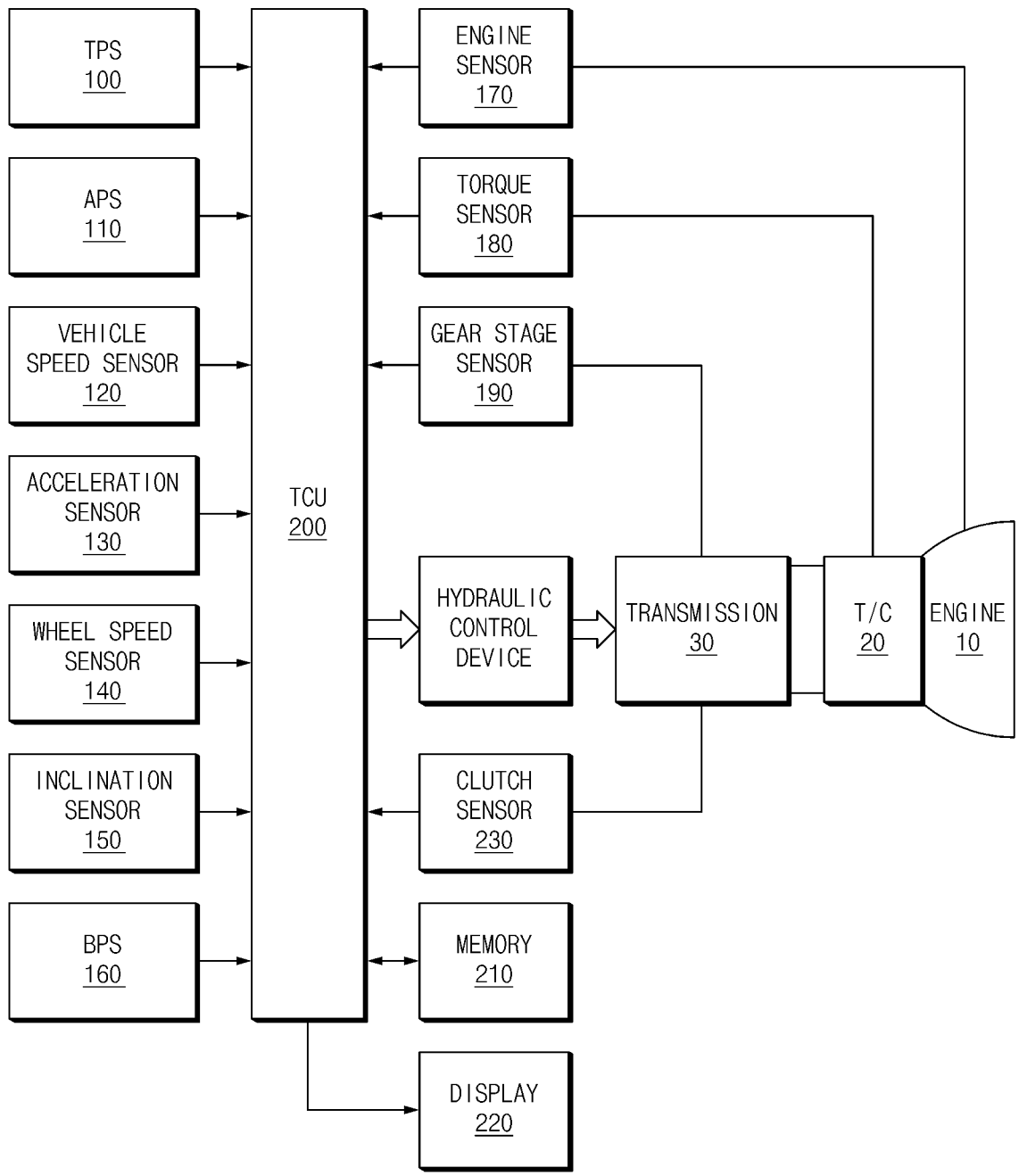
FIG. 1 is an exemplary view of a shift control system of a vehicle to which various exemplary embodiments of the present invention is applied.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is an exemplary view of a shift control system of a vehicle to which various exemplary embodiments of the present invention is applied. Although the case where the power source is an engine 10 will be referred to as various exemplary embodiments of the present invention, it is obvious that it may be applied in the same manner even when the power source is a motor.

As shown in FIG. 1, the shift control system of a vehicle to which various exemplary embodiments of the present invention is applied may include a throttle position sensor (TPS) 100, an accelerator position sensor (APS) 110, a vehicle speed sensor 120, an acceleration sensor 130, a wheel speed sensor 140, an inclination sensor 150, a brake position sensor (BPS) 160, an engine revolutions per minute (RPM) sensor 170, a torque sensor 180, a gear stage sensor 190, a transmission controller (TCU) 200, a memory 210, a display 220, and a clutch sensor 230. Wherein the torque sensor 180 may be replaced with a model or virtual torque sensor calculated from the model.

Looking at each of the components, first, the TPS 100 may detect a throttle position according to an opening amount of the throttle valve of the engine 10, and generate a throttle position detection signal accordingly. The APS 110 may detect an accelerator position corresponding to the operation state of an accelerator pedal by a driver, and generate an accelerator position detection signal accordingly. The vehicle speed sensor 120 may detect a vehicle speed to generate a vehicle speed detection signal as the vehicle is driven. The acceleration sensor 130 may detect a change in the longitudinal acceleration according to the driving of the vehicle to generate a longitudinal acceleration detection signal, or detect a change in the lateral acceleration to generate a lateral acceleration detection signal as the vehicle is driven. The wheel speed sensor 140 may detect a wheel speed according to the driving of the vehicle to generate a wheel speed detection signal. In the instant case, the wheel speed may include a front left (FL) wheel speed, a front right (FR) wheel speed, a rear left (RL) wheel speed, and a rear right (RR) wheel speed, and the wheel detection signal may be one of the FL wheel speed, the FR wheel speed, the RL wheel speed, and the RR wheel speed, or the average of the FL, FR, RL and RR wheel speeds. The inclination sensor 150 may detect the inclination of a vehicle body to generate an inclination detection signal as the vehicle is driven on a slope (or a curved road). The brake position sensor 160 may detect the operation state of the brake pedal of the driver to generate a brake position detection signal. The engine sensor 170 may include an RPM sensor that detects the rotation RPM to generate an RPM detection signal (speed signal) as the engine 10 is driven, and an engine torque sensor that detects a torque (hereinafter, an engine torque) as the engine 10 is driven. The torque sensor 180 may detect the rotation torque of a torque converter 20 coupled between the engine 10 and a transmission 30 to generate a torque detection signal. The gear stage sensor 190 may detect a gear stage operation state to generate a gear stage detection signal as the transmission 30 is shifted. In the instant case, the transmission 30 may be implemented with a dual clutch transmission (DCT).

Meanwhile, to control the gear shifting of the vehicle, the TCU 200 may receive the throttle position detection signal from the TPS 100, the accelerator position detection signal from the APS 110, the vehicle speed detection signal from the vehicle speed sensor 120, the acceleration detection signal from the acceleration sensor 130, the wheel speed detection signal from the wheel speed sensor 140, the inclination detection signal from the inclination sensor 150, the brake position detection signal from the BPS 160, the RPM detection signal from the engine RPM sensor 170, the torque detection signal from the torque sensor 180, and the gear stage detection signal from the gear stage sensor 190.

The TCU 200 may collect data for understanding a road condition (slope, curvature, or the like) and the driving state of the vehicle through the detection signals from each of the sensors, and may analyze the collected data and classify information. In the instant case, the driving information data analyzed through the collected data may include the opening amount of the throttle valve, the position of the accelerator, the current gear engagement state of the transmission, the vehicle speed, the acceleration, the engine RPM, the average vehicle speed, the wheel rotation speed difference, the vehicle inclination, the operating cycle of the brake, the torque demand of the engine, the curvature of the road, the slope of the road, and the like. The TCU 200 may perform a gear shifting (up/down shift) corresponding to a preset shift pattern based on the analyzed driving information data.

The memory 210 may store a shift pattern by a manual shift command of the driver, a shift pattern by a shift protection command, a shift pattern of a class defined by shifting in the class mode, and driving information data corresponding to the shift pattern of the class. The display 220 may display the shift progress state by applying the current shift pattern according to the control of the TCU 200 to enable the driver to check the shift progress state. The clutch sensor 230 may include a speed sensor that detects the speed of a clutch (e.g., an engagement-side clutch) provided in the transmission 30 to generate a speed detection signal, and a torque sensor that detects the torque of a clutch (e.g., an engagement-side clutch) provided in the transmission 30 to generate a torque detection signal.

Figure 2:
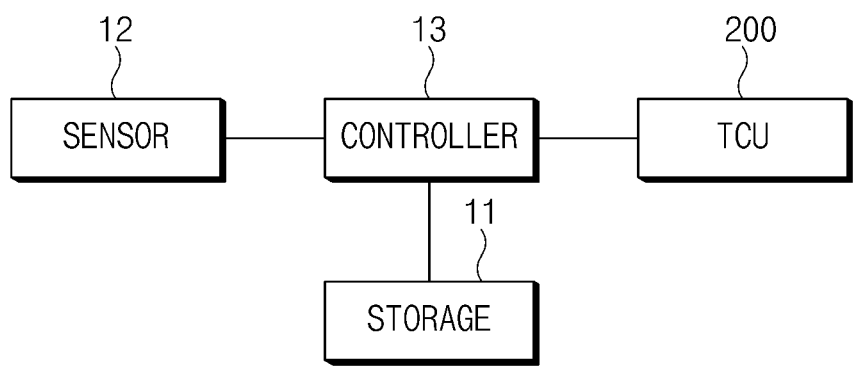
FIG. 2 is a block diagram illustrating an apparatus of controlling a gear shifting of a vehicle according to various exemplary embodiments of the present invention.

FIG. 2 is a block diagram of an apparatus of controlling a gear shifting of a vehicle according to various exemplary embodiments of the present invention.

As shown in FIG. 2, an apparatus of controlling a gear shifting of a vehicle according to various exemplary embodiments of the present invention may include storage 11, a sensor 12, and a controller 13. In the instant case, according to a scheme of implementing an apparatus of controlling a gear shifting of a vehicle according to various exemplary embodiments of the present invention, components may be combined with each other to be implemented as one, and some of the components may be omitted. Furthermore, the controller 13 may directly perform machine learning of the GP model stored in the storage 11.

Looking at each component, first, the storage 11 may store various logics, algorithms, and programs required in a process of detecting the change amount of the engine torque and the change amount of the engagement-side clutch torque used for an optimal shift based on the GP model on which machine learning has been completed and controlling the gear shifting of the vehicle according to the change amount of the engine torque and the change amount of the engagement-side clutch torque.

Figure 3:
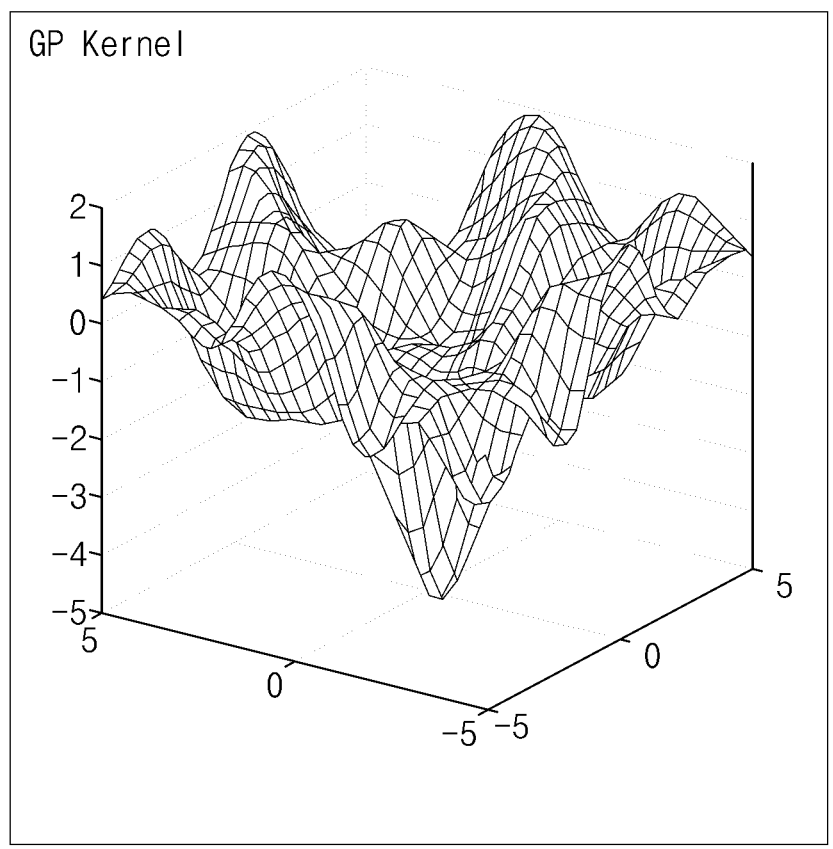
FIG. 3 is an exemplary view of a GP model provided in an apparatus of controlling a gear shifting of a vehicle according to various exemplary embodiments of the present invention.

The storage 11 may store the GP model on which the machine learning has been completed. As various exemplary embodiments of the present invention, the GP model is illustrated in FIG. 3, and the setting values of the GP model are illustrated in following Table 1.

TABLE 1

| Item | Setting value |
|---|---|
| Sampling Point | Ngp |
| Prediction Horizon | Nmpc |
| Mean function | zero-mean type |
| Covariance function (Kernel type) | Squared Exponential Automatic Relevance Determination |
| Uncertainty propagation | Taylor approximation |

In Table 1, the Ngp value and the Nmpc value which are natural numbers may vary depending on the output range of the engine 10 and the number of shifting stages. For example, the Ngp value may be 30, and the Nmpc value may be 6.

The storage 11 may store a gear ratio for each gear stage of the vehicle.

The storage 11 may store a target value for a state variable for each future prediction time. In the instant case, the prediction time may be expressed as 'sampling time×N (natural number)'. For example, when the sampling time is 10 ms and N=4, the future prediction time is 40 ms. Furthermore, the state variable may include an engine speed, an input shaft speed of the transmission 30, a slip speed of an engagement-side clutch, an engine torque, an engagement-side clutch torque, and a torsion angle of a driveshaft. In the instant case, the input shaft speed of the transmission 30 may be replaced with the output shaft speed.

The storage 11 may store a weight P added to the N-th stage error for each state variable, a weight (Q) added to an error from this to the (N−1)-th stage for each state variable, and a weight R added to a control input (the change amount of the engine torque and the change amount of the engagement-side clutch torque) from this to the (N−1)-th stage. In the instant case, the larger the value of the weight Q, the smaller the error, the larger the value of the weight R, the smaller the control input, and the weight P may be set to the same value as the weight Q for control stability.

The storage 11 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

As shown in FIG. 1, the sensor 12 may include the wheel speed sensor 140, the engine sensor 170, the gear stage sensor 190, and the clutch sensor 230.

The controller 13 may perform overall control such that each of the components can perform its function normally. The controller 13 may be implemented in a form of hardware or software, or may be implemented in a form of a combination of hardware and software. The controller 13 may be implemented with a microprocessor, but is not limited thereto.

The controller 13 may perform various controls in a process of detecting the change amount of the engine torque and the change amount of the engagement-side clutch torque used for an optimal shift based on the GP model on which machine learning has been completed and controlling the gear shifting of the vehicle according to the change amount of the engine torque and the change amount of the engagement-side clutch torque.

Hereinafter, the operation of the controller 13 will be described in detail with reference to FIG. 4.

Figure 4:
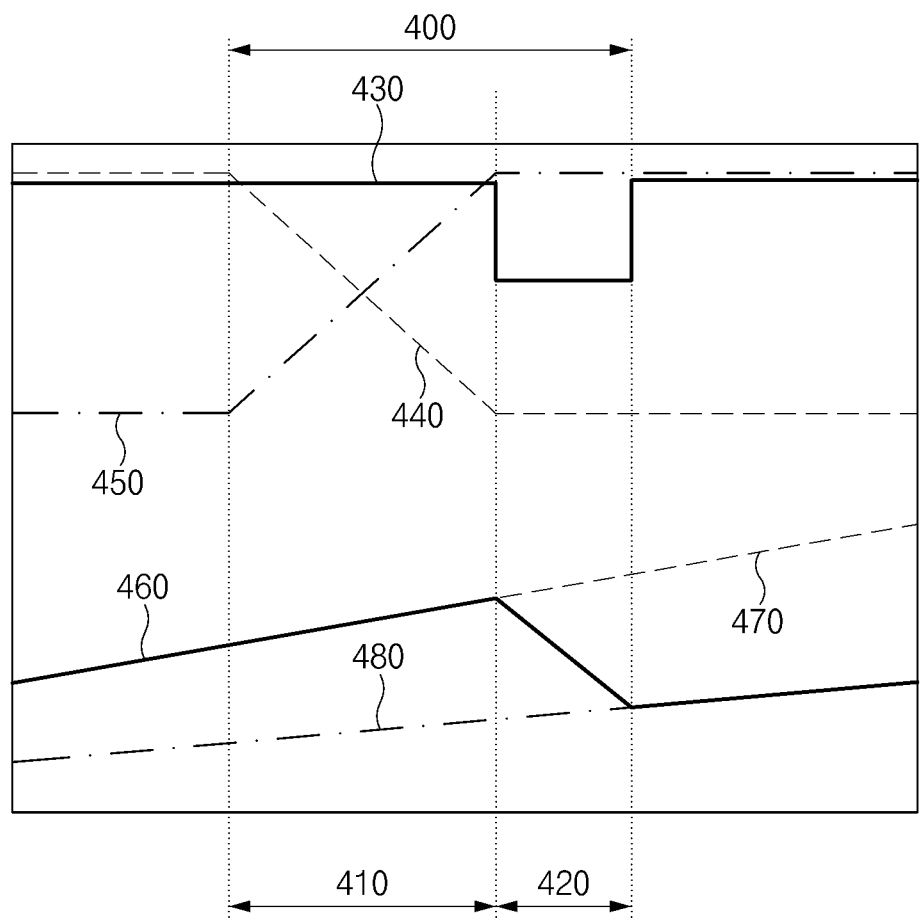
FIG. 4 is an exemplary view exemplarily illustrating a section in which a controller provided in an apparatus of controlling a gear shifting of a vehicle according to various exemplary embodiments of the present invention controls the gear shifting of the vehicle.

FIG. 4 is an exemplary view exemplarily illustrating a section in which a controller provided in an apparatus of controlling a gear shifting of a vehicle according to various exemplary embodiments of the present invention controls the gear shifting of the vehicle. FIG. 4 illustrates a shift section in a process of shifting from the first stage to the second stage.

In FIG. 4, reference numeral '400' represents the entire shift section, reference numeral '410' represents a torque phase within the entire shift section 400, and reference numeral '420' represents an inertia phase within the entire shift section 400.

Furthermore, reference numeral '430' represents the engine torque, reference numeral '440' represents the release-side clutch torque, reference numeral '450' represents the engagement-side clutch torque, reference numeral '460' represents the engine speed, and reference numeral '470' represents the release-side clutch speed, and reference numeral '480' represents the engagement-side clutch speed.

The controller 13 may improve the shift quality (shift quality) by adjusting the engine torque and the engagement-side clutch torque in the inertia phase 420.

The controller 13 may input, to the GP model, the engine speed, the input shaft speed of the transmission 30, the slip speed of the engagement-side clutch, the engine torque, the engagement-side clutch torque, the torsion angle of the driveshaft, which are detected in the previous step (previous time point), the change amount of the engine torque detected at the current step (current time point), the change amount of the engagement-side clutch torque, and may obtain the engine speed, the engagement-side clutch speed, the engine torque, and the engagement-side clutch torque as outputs of the GP model.

The controller 13 may determine the slip speed of the engagement-side clutch based on the difference between the engine speed and the engagement-side clutch speed. For example, the controller 13 may determine the slip speed of the engagement-side clutch by subtracting the engagement-side clutch speed from the engine speed.

The controller 13 may determine the input shaft speed of the transmission 30 according to the wheel speed detected by the wheel speed sensor 140 and the gear ratio corresponding to the current gear stage detected by the gear stage sensor 190. In the instant case, the controller 13 may determine the input shaft speed of the transmission 30, for example, by multiplying the wheel speed by the gear ratio.

The controller 13 may determine the torsion angle of the driveshaft according to the wheel speed detected through the wheel speed sensor 140 and the clutch speed detected through the clutch sensor 230. In the instant case, the controller 13 may determine the torsion angle of the driveshaft, for example, by integrating the difference between the wheel speed and the clutch speed.

Meanwhile, the controller 13 may detect the change amount of the engine torque and the change amount of the engagement-side clutch torque used for the optimal shift by solving the model predictive control (MPC) optimization problem based on the GP model. In the instant case, the MPC optimization problem is expressed as following Equation 1, as an example.

$$\min_u \mathbb{E}((x_N - r_N)^\top P(x_N - r_N) +$$
$$\sum_{i=0}^{N-1} \{(x_i - r_i)^\top Q(x_i - r_i) + u_i^\top R u_i\})$$
[Equation 1]

Where 'x' represents the engine speed, the input shaft speed of the transmission 30, the slip speed of the engagement-side clutch, the engine torque, the engagement-side clutch torque, and the torsion angle of the driveshaft as state variables, 'r' represents the target value (set value) of the state variable for each future prediction time, and 'u' represents the change amount of the engine torque and the change amount of the engagement-side clutch torque. In the instant case, an effective range (minimum value and maximum value) of each state variable may be determined.

Furthermore, the prediction time may be expressed as 'sampling time×N (natural number)'. For example, when the sampling time is 10 ms and N=4, the future prediction time is 40 ms. Furthermore, 'P' represents the weight assigned to the N-th stage error for each state variable, 'Q' represents the weight assigned to the errors from this to the (N−1)-th stage for each state variable, and 'R' represents the weight assigned to the control input (the change amount of the engine torque and the change amount of the engagement-side clutch torque) from this to the (N−1)-th stage error.

In various exemplary embodiments of the present invention, an example in which the controller 13 is implemented as a separate configuration has been described, but it is possible to implement the function of the controller 13 by installing the function of the controller 13 into the TCU 200 to allow the TCU 200 to perform the function of the controller 13.

FIG. 5A, FIG. 5B, FIG. 5C, and FIG. 5D are exemplary views exemplarily illustrating the performance of an apparatus of controlling a gear shifting of a vehicle according to various exemplary embodiments of the present invention.

Figure 5A:
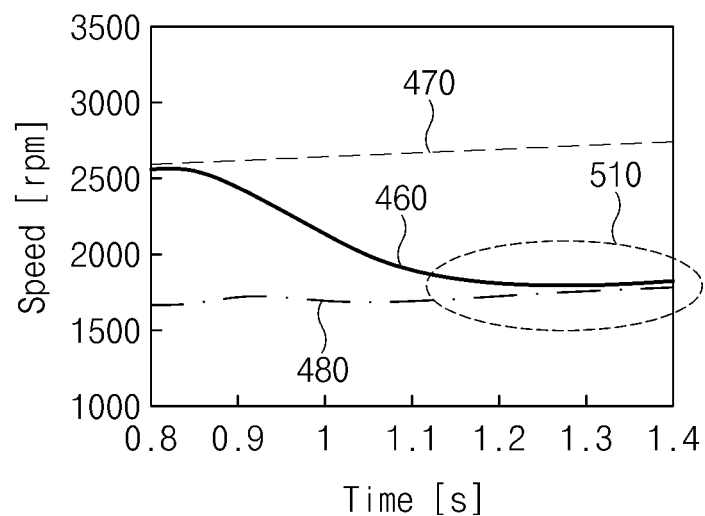
FIG. 5A, FIG. 5B, FIG. 5C, and FIG. 5D are exemplary views exemplarily illustrating the performance of an apparatus of controlling a gear shifting of a vehicle according to various exemplary embodiments of the present invention.
Figure 5B:
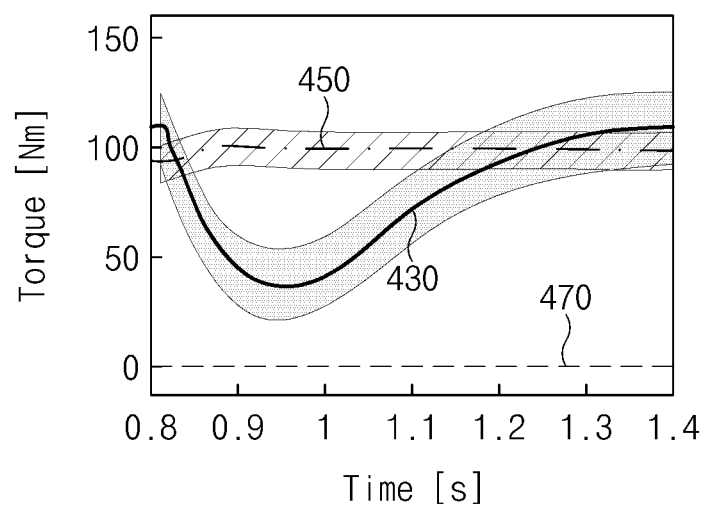
Figure 5C:
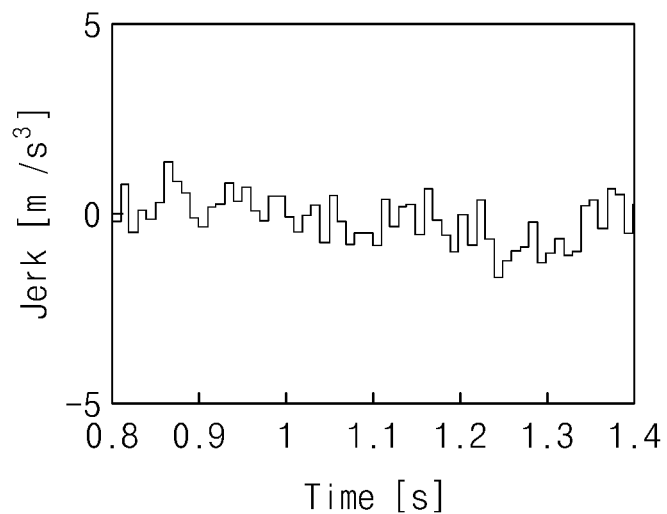
Figure 5D:
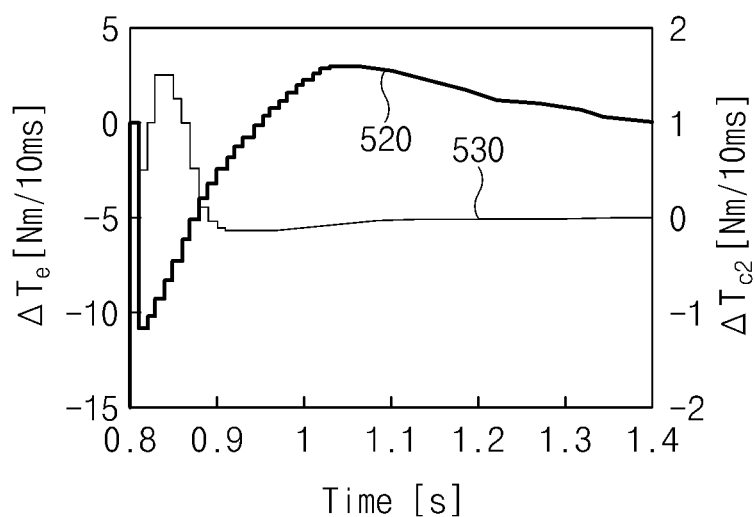

As shown in FIG. 5A, it may be understood that the slip speed of the engagement-side clutch is smoothly reduced 510. As shown in FIG. 5B, it may be understood that the engine torque 430 and the engagement-side clutch torque 450 are optimized. As shown in FIG. 5C, it may be understood that the jerk in the shifting process is minimized. As shown in FIG. 5D, it may be understood that the change amount $\Delta T_e$ 520 of the engine torque used for the optimal shift and the change amount $\Delta T_{c2}$ 530 of the engagement-side clutch torque are detected. Furthermore, the shaded portions in FIG. 5B represent the covariance of the engine torque 430 and the covariance of the engagement-side clutch torque 450, respectively.

Figure 6:
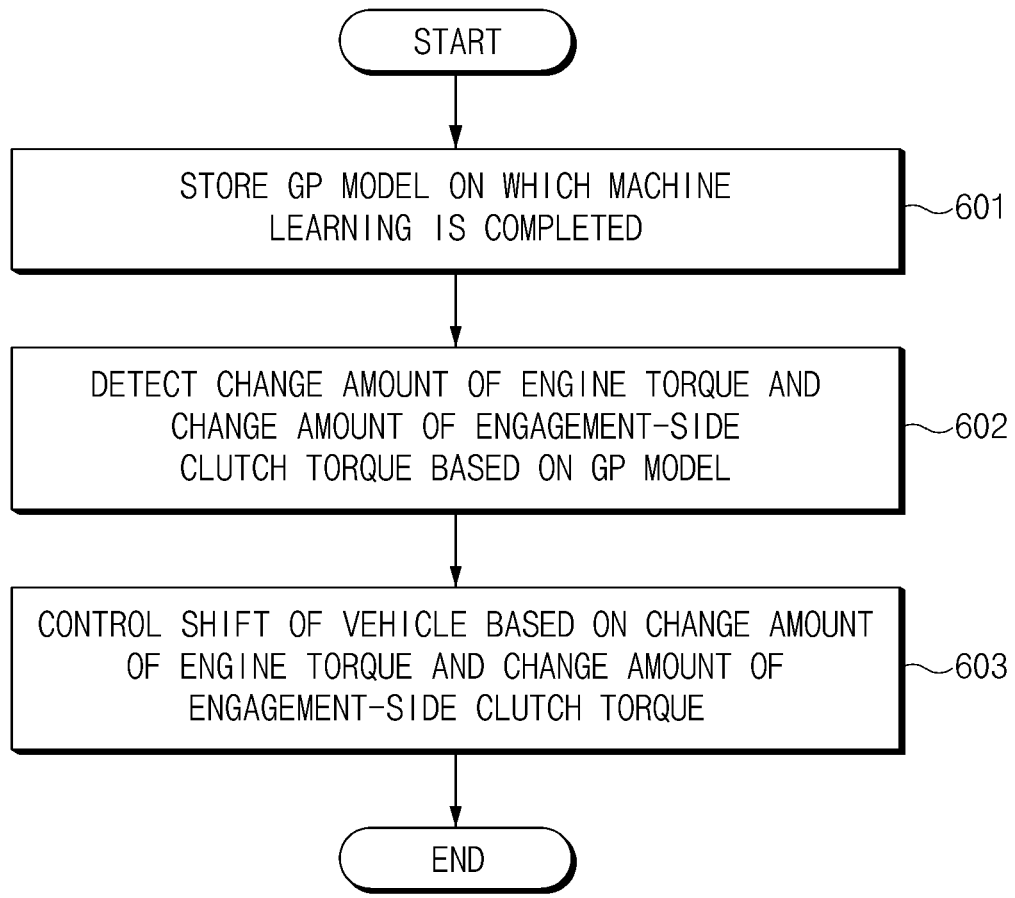
FIG. 6 is a flowchart of a method of controlling a gear shifting of a vehicle according to various exemplary embodiments of the present invention.

FIG. 6 is a flowchart of a method of controlling a gear shifting of a vehicle according to various exemplary embodiments of the present invention.

First, in 601, the storage 11 stores the GP model on which the machine learning has been completed.

Accordingly, in 602, the controller 13 detects the change amount of the engine torque and the change amount of the engagement-side clutch torque based on the GP model. In the instant case, the controller 13 may input, to the GP model, the engine speed, the input shaft speed of the transmission 30, the slip speed of the engagement-side clutch, the engine torque, the engagement-side clutch torque, the torsion angle of the driveshaft, which are detected in the previous step (k−1), the change amount of the engine torque detected at the current step (k), the change amount of the engagement-side clutch torque, and may obtain the engine torque and the engagement-side clutch torque as the outputs of the GP model.

Accordingly, in 603, the controller 130 may control the gear shifting of the vehicle according to the change amount of the engine torque and the change amount of the engagement-side clutch torque.

Figure 7:
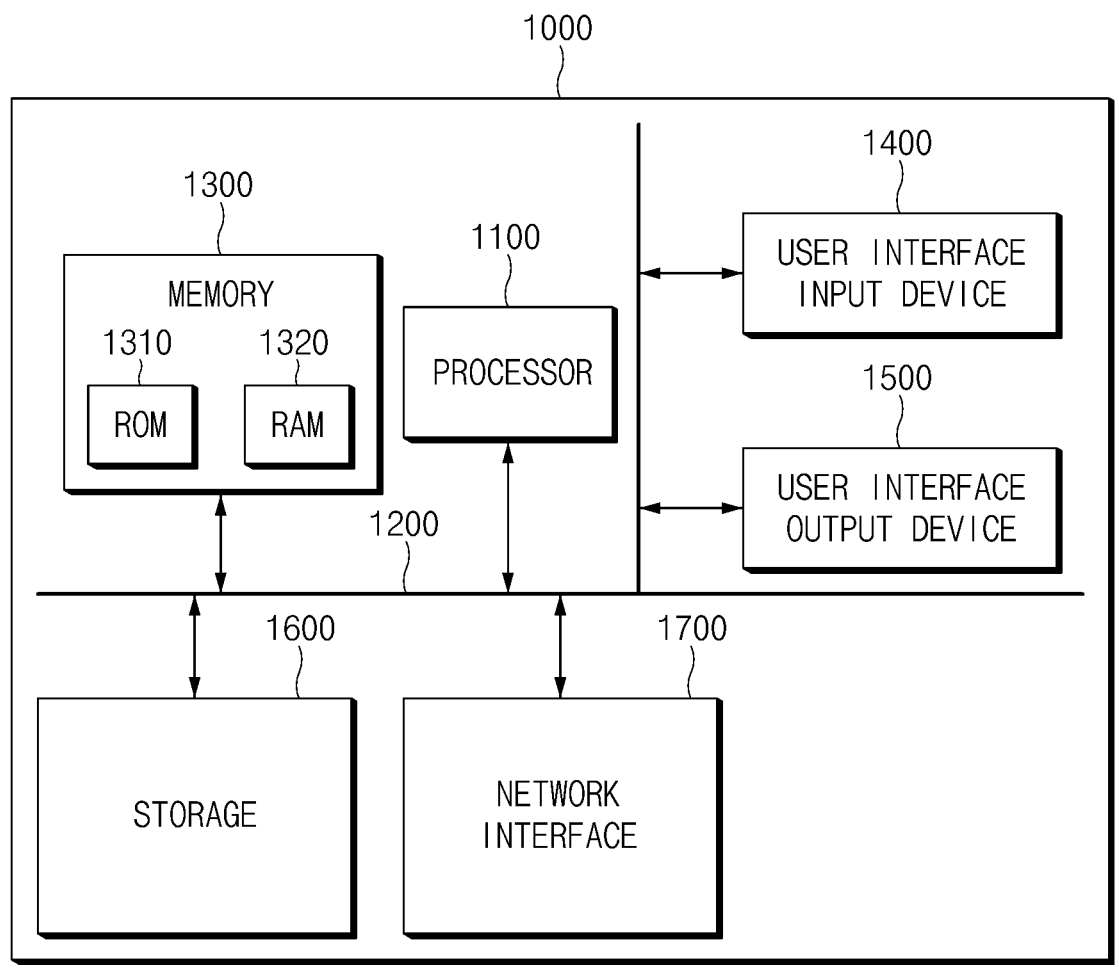
FIG. 7 is a block diagram illustrating a computing system for executing a method of controlling a gear shifting according to various exemplary embodiments of the present invention.

FIG. 7 is a block diagram illustrating a computing system for executing a method of controlling a gear shifting according to various exemplary embodiments of the present invention.

Referring to FIG. 7, as described above, the method of controlling a gear shifting of a vehicle according to various exemplary embodiments of the present invention may be implemented through a computing system. The computing system 1000 may include at least one processor 1100, a memory 1300, a user interface input device 1400, a user interface output device 1500, storage 1600, and a network interface 1700, which are connected through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the exemplary embodiments of the present invention, the apparatus and method for controlling a gear shifting of a vehicle and a method thereof can detect the change amount of engine torque used for optimal shift and the change amount of engagement-side clutch torque used for optimal shift based on the GP model on which the machine learning has been completed, and can control the gear shifting of the vehicle based on the detection result, improving shift quality by minimizing the jerk generated in the shifting process of the vehicle.

The above description is a simple exemplification of the technical spirit of the present invention, and the present invention may be variously corrected and modified by those skilled in the art to which various exemplary embodiments of the present invention pertains without departing from the essential features of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a gear shifting of a vehicle, the apparatus comprising:
   a storage configured to store a Gaussian process (GP) model on which machine learning is completed; and
   a controller configured to detect a change amount of an engine torque and a change amount of an engagement-side clutch torque according to the GP model, and control the gear shifting of the vehicle according to the change amount of the engine torque and the change amount of the engagement-side clutch torque.

2. The apparatus of claim 1, wherein the controller is configured to input, to the GP model, an engine speed, an input shaft speed of a transmission in the vehicle, an engagement-side clutch slip speed, the engine torque, the engagement-side clutch torque, a torsion angle of a driveshaft detected at a previous time point, and the change amount of the engine torque and the change amount of the engagement-side clutch torque detected at a current time point, and obtain the engine torque and the engagement-side clutch torque as an output of the GP model.

3. The apparatus of claim 2, further including:
   a wheel speed sensor configured to detect a wheel speed of the vehicle;
   a gear stage sensor configured to detect a current gear stage of the vehicle; and
   a clutch sensor configured to detect an engagement-side clutch speed of the vehicle.

4. The apparatus of claim 3, wherein the controller electrically connected to the clutch sensor is configured to determine the engagement-side clutch slip speed according to a difference between the engine speed and the engagement-side clutch speed detected by the clutch sensor.

5. The apparatus of claim 3, wherein the controller electrically connected to the wheel speed sensor and the gear stage sensor is configured to determine the input shaft speed of the transmission according to the wheel speed detected by the wheel speed sensor and a gear ratio corresponding to the current gear stage detected by the gear stage sensor.

6. The apparatus of claim 3, wherein the controller electrically connected to the wheel speed sensor and the clutch sensor is configured to determine the torsion angle of the driveshaft according to the wheel speed detected by the wheel speed sensor and the engagement-side clutch speed detected by the clutch sensor.

7. The apparatus of claim 1, wherein the controller is configured to obtain a solution of a model predictive control (MPC) optimization problem according to the GP model to detect the change amount of the engine torque and the change amount of the engagement-side clutch torque.

8. The apparatus of claim 1, wherein the controller is configured to adjust the engine torque and the engagement-side clutch torque in an inertia phase.

9. The apparatus of claim 1, wherein the GP model includes a mean function which is a zero-mean type, a covariance function which is a squared exponential automatic relevance determination, and uncertainty propagation which is a Taylor approximation.

10. A method of controlling a gear shifting of a vehicle, the method comprising:
    storing, by a storage, a Gaussian process (GP) model on which machine learning is completed;
    detecting, by a controller, a change amount of an engine torque and a change amount of an engagement-side clutch torque according to the GP model; and
    controlling, by the controller, the gear shifting of the vehicle according to the change amount of the engine torque and the change amount of the engagement-side clutch torque.

11. The method of claim 10, wherein the detecting of the change amount of the engine torque and the change amount of the engagement-side clutch torque includes:
    inputting, to the GP model, an engine speed, an input shaft speed of a transmission in the vehicle, an engagement-side clutch slip speed, the engine torque, the engagement-side clutch torque, a torsion angle of a driveshaft detected at a previous time point, and the change amount of the engine torque and the change amount of the engagement-side clutch torque detected at a current time point; and
    obtaining the engine torque and the engagement-side clutch torque as an output of the GP model.

12. The method of claim 11, further including:
    detecting, by a wheel speed sensor, a wheel speed of the vehicle;
    detecting, by a gear stage sensor, a current gear stage of the vehicle; and
    detecting, by a clutch sensor, an engagement-side clutch speed of the vehicle.

13. The method of claim 12, wherein the inputting to the GP model includes:
    determining the engagement-side clutch slip speed according to a difference between the engine speed and the engagement-side clutch speed detected by the clutch sensor.

14. The method of claim 12, wherein the inputting to the GP model includes:
    determining the input shaft speed of the transmission according to the wheel speed detected by the wheel speed sensor and a gear ratio corresponding to the current gear stage detected by the gear stage sensor.

15. The method of claim 12, wherein the inputting to the GP model includes:
    determining the torsion angle of the driveshaft according to the wheel speed detected by the wheel speed sensor and the engagement-side clutch speed detected by the clutch sensor.

16. The method of claim 10, wherein the controlling of the gear shifting of the vehicle includes:
    obtaining a solution of a model predictive control (MPC) optimization problem according to the GP model to detect the change amount of the engine torque and the change amount of the engagement-side clutch torque.

17. The method of claim 10, wherein the controlling of the gear shifting of the vehicle includes:
    adjusting the engine torque and the engagement-side clutch torque in an inertia phase.

18. The method of claim 10, wherein the GP model includes a mean function which is a zero-mean type, a covariance function which is a squared exponential automatic relevance determination, and uncertainty propagation which is a Taylor approximation.

\* \* \* \* \*